(12) United States Patent
Vidwans et al.

(10) Patent No.: US 6,643,742 B1
(45) Date of Patent: Nov. 4, 2003

(54) METHOD AND SYSTEM FOR EFFICIENT CACHE MEMORY UPDATING WITH A LEAST RECENTLY USED (LRU) PROTOCOL

(75) Inventors: Rohit Vidwans, Portland, OR (US); James A. Beavens, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/528,748

(22) Filed: Mar. 20, 2000

(51) Int. Cl.[7] .............................................. G06F 12/00
(52) U.S. Cl. ...................................... 711/136; 711/144
(58) Field of Search ................................ 711/118, 136, 711/144, 131, 150

(56) References Cited

U.S. PATENT DOCUMENTS

| | | | | |
|---|---|---|---|---|
| 5,067,078 A | * | 11/1991 | Talgam | 395/400 |
| 5,680,577 A | * | 10/1997 | Aden | 395/477 |
| 5,752,260 A | * | 5/1998 | Liu | 711/129 |
| 5,778,432 A | * | 7/1998 | Rubin et al. | 711/135 |
| 5,826,109 A | * | 10/1998 | Abramson | 395/859 |
| 5,978,888 A | | 11/1999 | Arimilli et al. | 711/128 |
| 6,014,732 A | * | 1/2000 | Naffziger | 711/203 |
| 6,282,617 B1 | * | 8/2001 | Tirumala | 711/133 |

* cited by examiner

Primary Examiner—Kimberly McLean-Mayo
(74) Attorney, Agent, or Firm—Blakely, Sokoloff, Taylor & Zafman LLP

(57) ABSTRACT

A method of and system for concurrently processing multiple memory requests. The first and second memory requests contain a linear address. A search for the cache entry in a cache block is issued in response to the linear address. After locating the cache entries associated with the memory requests, there is an update of the least recently used status for the cache entries with reference to the memory requests.

12 Claims, 9 Drawing Sheets

Figure 5

| ACTION | L0 | L1 | L2 |
|---|---|---|---|
| READ CACHE ENTRY 0 | 1 | 1 | X |
| READ CACHE ENTRY 1 | 1 | 0 | X |
| READ CACHE ENTRY 2 | 0 | X | 1 |
| READ CACHE ENTRY 3 | 0 | X | 0 |

Figure 7

| ENTRY TO REPLACE | L0 | L1 | L2 |
|---|---|---|---|
| ENTRY 0 | X | 0 | 0 |
| ENTRY 1 | X | 1 | 0 |
| ENTRY 2 | 0 | X | 1 |
| ENTRY 3 | 1 | X | 1 |

Figure 8

| | HIT VECTOR 1 $h_3\ h_2\ h_1\ h_0$ | HIT VECTOR 2 $h_3\ h_2\ h_1\ h_0$ | NEW LRU L2, L1, L0 | WRITE MASK mz, m1, m0 |
|---|---|---|---|---|
| Location 0 | 0001 | 0001 | 011 | 011 |
| Location 1 | 0001 | 0010 | 011 | 011 |
| Location 2 | 0001 | 0100 | 111 | 111 |
| Location 3 | 0001 | 1000 | 011 | 111 |
| ⋮ | ⋮ | ⋮ | ⋮ | ⋮ |
| Location 19 | 1000 | 0001 | 011 | 111 |
| Location n | ⋮ | ⋮ | ⋮ | ⋮ |

METHOD AND SYSTEM FOR EFFICIENT CACHE MEMORY UPDATING WITH A LEAST RECENTLY USED (LRU) PROTOCOL

BACKGROUND OF THE INVENTION

1. Field of the Invention

The present invention relates to cache management design, and specifically to a system and method for analyzing and replacing cache memory locations.

2. Description of the Related Art

A computing system for processing information can include a system memory. Moreover, one or more processing modules of the system can include a cache memory. A cache memory is a relatively small high-speed memory that stores a copy of information from one or more portions of the system memory. For example, a cache memory could store 1 Million bits (1 M), and a system memory could store 1–100 Million bits. Normally, the cache memory is physically distinct from the system memory, and each processing module manages the state of its respective cache memory. Typically, a cache memory is located within a processor or on the same integrated circuit, and system memory is located at an external location on another logic board or module.

If a processor requests access to commonly used locations in the system memory, a memory controller copies a portion of the commonly used locations from the system memory into the processing module's cache memory. Copying the commonly used locations results in quicker access times due to the proximity and faster access times of the cache memory relative to the system memory and increases the processor's performance. In the event of a cache miss, a condition where the processor requests a certain address and data from a location in cache memory, but the cache memory does not contain the address, the cache memory requests the address from the system memory. However, the cache miss results in a significant system performance impact due to the relatively long time delay in waiting for the slower system memory to respond to the request and fetch the address and data. Eventually, the new address and data are stored at a location in the cache memory.

Efficient cache operation requires cache management techniques for replacing cache locations in the event of a cache miss. In the previous example of a cache miss, the address and data fetched from the system memory is stored in cache memory. However, the cache needs to determine which cache location is to be replaced by the new address and data from system memory. One technique for replacing cache locations is implementing least recently used bits and valid bits for each cache location. Least recently used bits are stored for each cache location and are updated when the cache location is accessed. Valid bits determine the coherency status of the respective cache location. Therefore, based on the value of the least recently used bits and the valid bits, the cache effectively replaces the cache locations where the least recently used bits indicate minimal activity or the location lacks coherency.

Present cache memory management logic are inefficient, requiring two read cycles, one read cycle for valid bits, and another separate read cycle for least recently used bits. Also, cache memory management logic requires dedicated and inflexible priority procedures for replacing least recently used cache locations.

BRIEF DESCRIPTION OF THE SEVERAL VIEWS OF THE DRAWINGS

The present invention is illustrated by way of example and not limitation in the following figures. Like references indicate similar elements, in which:

FIG. 5 illustrates a logic truth table in accordance with the present invention.

FIG. 7 illustrates a logic truth table in accordance with the present invention.

FIG. 8 illustrates a logic truth table in accordance with the present invention.

DETAILED DESCRIPTION OF THE INVENTION

A method and system for cache management design and specifically a method and system for analyzing and replacing cache memory locations are described. In the following description, for purposes of explanation, numerous details are set forth in order to provide a thorough understanding of the present invention. However, it will be apparent to one skilled in the art that these specific details are not required in order to practice the present invention.

Figure 1:
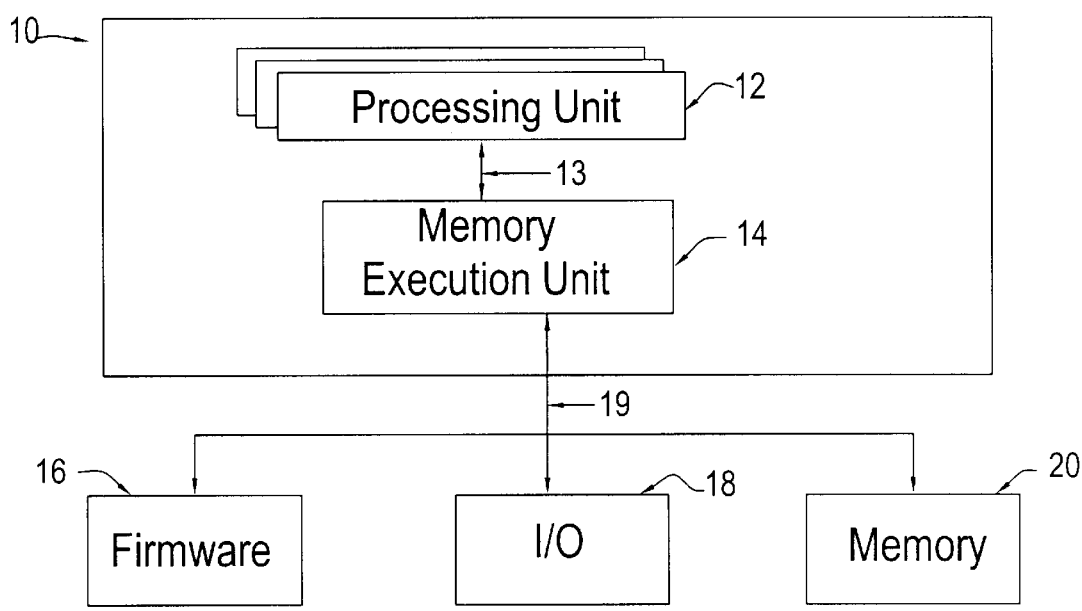
FIG. 1 shows a prior art system.

FIG. 1 illustrates a prior art system block diagram. Computer system 10 may have one or more processing units 12, a Memory Execution Unit (MEU) 14, and bus 13 coupling the processing unit(s) 12 and the MEU 14. An exemplary processing unit 12 is an Intel Pentium™ II microprocessor.

Computer system 10 is connected to various peripheral devices, including input/output (I/O) devices 18 (such as a display monitor, keyboard, and permanent storage device), and memory device 20 (such as random-access memory or RAM) that is used by the processing units to carry out program instructions. Various functions of the computer system 10 are controlled by firmware 16, including seeking out and loading an operating system from one of the peripherals (usually the permanent memory device) when the computer is first turned on. Bus 19 is a generalized interconnect bus over which the processing unit 12 communicates with the peripheral devices. Computer system 10 may have many additional components, which are not shown, such as serial and parallel ports for connection to, e.g., modems or printers. Those skilled in the art will further appreciate that there are other components that might be used in conjunction with those shown in the block diagram of FIG. 1, for example, a display adapter might be used to control a video display monitor, a memory controller might be used to access memory 20, etc.

Figure 2:
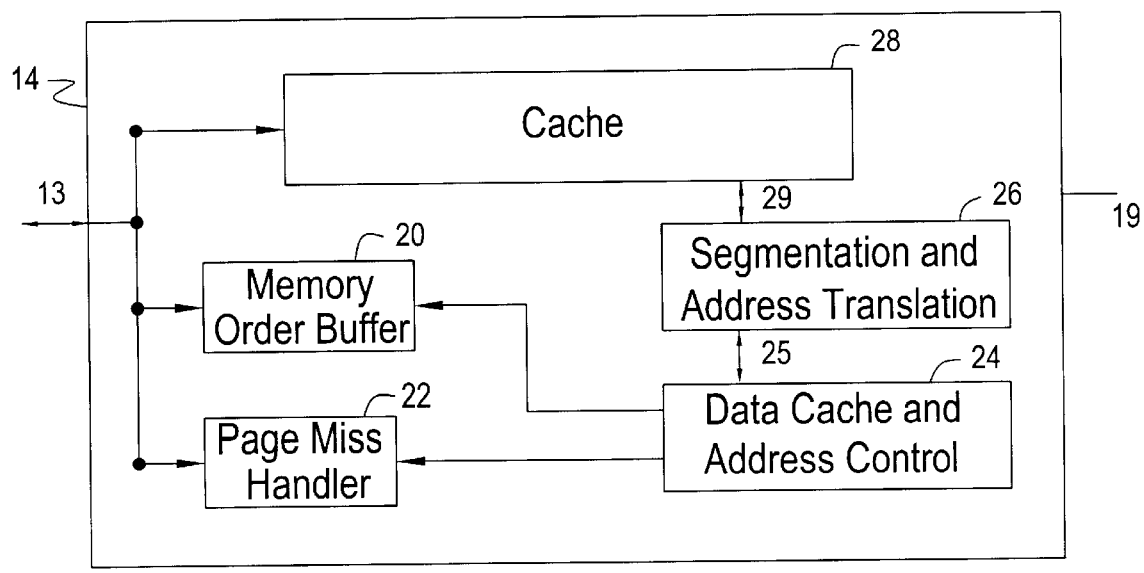
FIG. 2 shows a block diagram of a memory execution unit in accordance with the present invention.

FIG. 2 illustrates a block diagram of the MEU 14 in accordance with an embodiment of the present invention. The MEU 14 comprises a cache 28, memory order buffer 20, Page Miss Handler (PMH) 22, Segmentation And Address Translation unit (SAAT) 26, and a data cache and address control 24. In one embodiment of the invention, the cache 28 is a level one 256-kilobyte instruction and data cache and is fully associative. A fully associative cache allows every system memory location to be mapped to every cache location. The MEU 14 generates and retrieves the cache data and information to satisfy the processing unit's memory requests. In one embodiment of the invention, the MEU 14 receives memory requests from the processing unit 12 via the internal bus 13.

The MEU 14 processes the memory request by translating the linear address of the memory request to a physical address. Also, a subset of commonly used linear to physical address translations is stored in page tables. In particular, SAAT 26 translates the linear address to a physical address, and the PMH 22 stores and updates the page tables. The SAAT 26 receives memory requests from data cache and address control 24 via the bus 25. The operation of SAAT 26 is further discussed below with reference to FIG. 3. The data cache and address control 24 manages the priority of the memory requests between the processor and SAAT 26. The memory order buffer 20 receives the various memory requests from the processor via bus 13 and stores the requests until they are processed by data cache and address control 24. The MEU 14 is coupled to bus 19 for communicating with I/O devices 18 and memory device 20.

Figure 3:
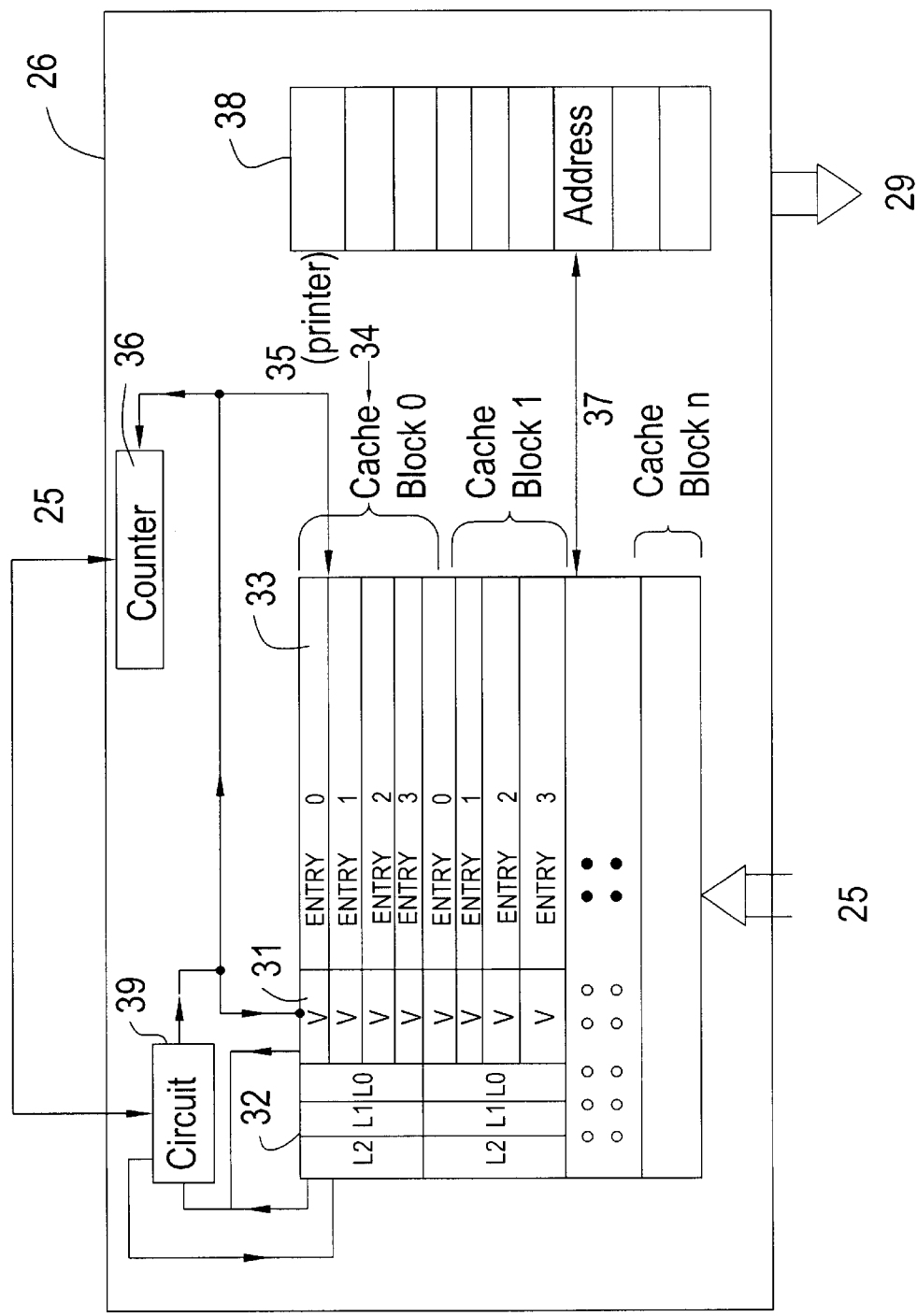
FIG. 3 shows a block diagram of segment and address translation unit in accordance with the present invention.

FIG. 3 illustrates a detailed block diagram of the SAAT 26 in accordance with an embodiment of the present invention. The SAAT 26 comprises a linear address array 30, a physical address array 38, a plurality of Least Recently Used (LRU) registers 32, a plurality of valid bit registers 31, a circuit 39, and a counter 36. The SAAT 26 receives memory requests specifying linear addresses from the processing unit 12 via the internal bus 25. The SAAT translates the linear address in the memory request to a physical address. In one embodiment, the linear address is 32 bits, and the physical address is 36 bits. The SAAT also updates the LRU registers 32 and valid bit registers 31.

The linear address array 30 comprises a plurality of cache blocks 34. Each cache block 34 comprises cache entries 33. In one embodiment there are 16 cache blocks, each containing four cache entry elements 33. One skilled in the art appreciates configuring the linear address array 30 with 32 cache blocks containing 2 cache entry elements, or, for larger cache memory requirements, 64 cache blocks containing 8 cache entry blocks may be utilized. Each cache block 34 has a three-bit LRU register 32 and four bit valid register 31, one valid bit per cache entry 33. The three bits in the LRU register 32 represent the least recently used status of the cache entries 33 in a cache block 34. The procedure for generating the three LRU bits is discussed below with reference to FIG. 4. The valid bits indicate the validity of the data in the cache entries 33, that is, whether the cache entries contain the "correct" version of data, or an outdated and modified copy of data. The procedure for generating the valid bits in a pseudo-random logic is discussed in more detail below with reference to FIG. 4.

There are many advantages to integrating the valid bit register 31 with the three bit LRU register 32 in the same linear address array 30, including decreasing the amount of time needed to calculate the bits due to the physical proximity of the logic gates. Also, integrating LRU bits and valid bits minimizes the logic complexity and decreases the amount of silicon area and power requirements for the SAAT 26. Furthermore, another advantage is a reduction in access and read time of the LRU register 32 and valid bit register 31.

The SAAT 26 receives the linear address of the memory request, searches for a cache block in the linear address array 30 that contains the linear address, and reads the LRU register 32 and valid register 31 for that cache block (reading LRU register 32 and valid register 31 is discussed below with reference to FIGS. 5–8). Then, the SAAT 26 translates the linear address to a physical address and transfers the physical address to array 38 via interconnect 37. Array 38 receives the physical address and retrieves the contents of the entry pointed to by the physical address. The contents of the entry, a cache address and priority, are transferred on bus 29 back to the cache 28. The cache retrieves the data from the cache entry pointed by the cache address, and transfers the data to the processor via bus 13.

The counter 36 is a four bit counter and directs a pointer 35 to one of the cache blocks 34. For example, if the counter is set to 0000, the pointer 35 selects cache block 0. The counter 36 is set by the data cache and address control 24 via line 25. Within a cache block, the pointer 35 selects a cache entry 33 based on the value of the LRU register 32, as further discussed below with reference to FIG. 7.

Figure 4:
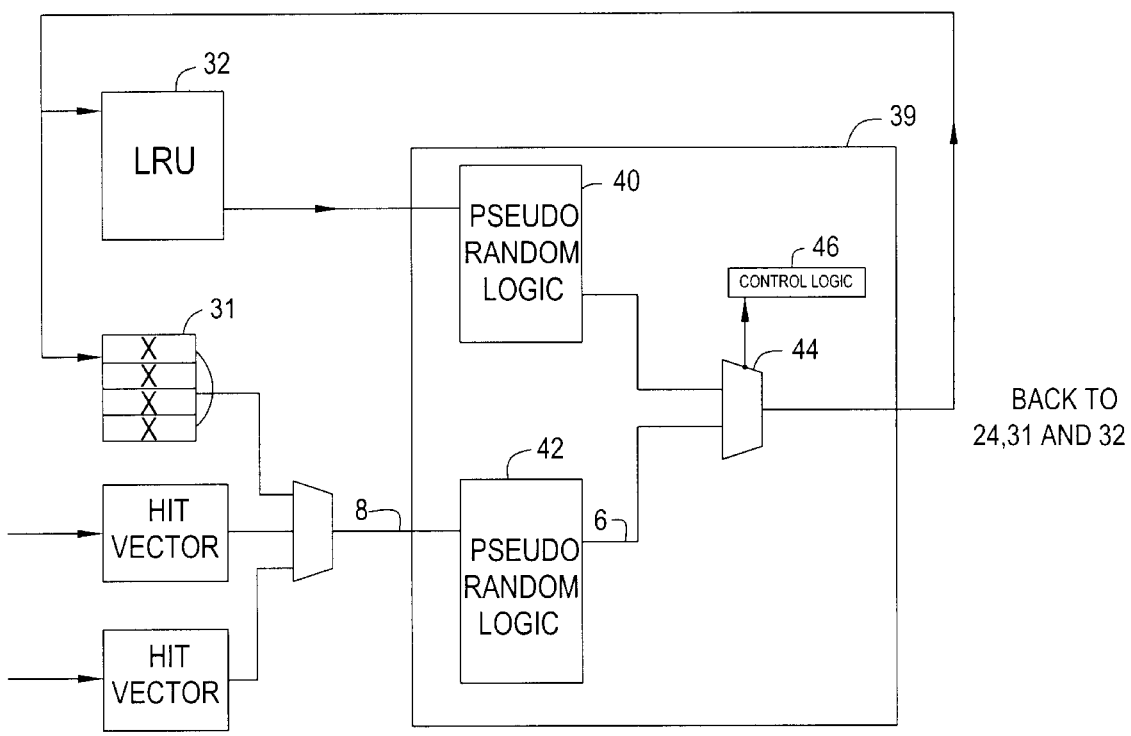
FIG. 4 illustrates a circuit in accordance with the present invention.

FIG. 4 illustrates circuit 39 in accordance with an embodiment of the present invention. The circuit 39 analyzes and updates the LRU register 32 and the valid bit register 31 for a given cache block based on pseudo-random logic for every read cycle on a cache entry 33. For example, when a cache entry 33 needs to be replaced, the LRU register 32 is analyzed and the least recently used cache entry 33 is replaced.

The circuit 39 is coupled to and receives inputs from the LRU register 32 and the valid bit register 31 of the active cache block 34. Also, circuit 39 receives the inputs of two four-bit hit vectors via internal bus 25. The MEU 14 can receive multiple memory requests. A hit vector is a multiple memory request and contains four valid status bits of a cache block 34. Also, the circuit 39 contains a pseudo random logic block 40, pseudo random logic block 42, and a multiplexer 44. The circuit 39 updates the LRU register 32, the valid status bit register 31, and writes mask bits to the data cache and address control 24, which will be discussed below with reference to FIG. 8. The logic for the pseudo random logic block 40 and pseudo random logic block 42 will be discussed below with reference to FIGS. 5–8. The control logic 46 coupled to the control input of the multiplexer 44, causes the multiplexer 44 to select either the output of pseudo random logic block 40 or pseudo random logic block 42 based on priority. For example, if the valid status bit register 31 indicates the cache entries are "outdated", then the processing of valid status bit register 31 is given priority over the LRU register 32. Therefore, the multiplexer 44 selects the output of pseudo random logic block 42 over the output of pseudo random logic block 40. Otherwise, the multiplexer 44 selects the output of pseudo random logic block 40 over the output of pseudo random logic block 42.

FIG. 5 illustrates a truth table 58 in accordance with an embodiment of the present invention. For every read access to a cache entry 33, the LRU register 32 is updated. The truth table 58 represents the new value of the LRU register 32 for a cache block 34 for every read access to a cache entry 33 in the cache block. The LRU register 32 is updated for every read access so that when a cache entry 33 needs to be replaced, the contents of the LRU register 32 are accurate and reliable.

Truth table 58 represents the three bits of the LRU register 32, L0, L1 and L2. Column 56 represents the L0 bit, column 54 represents the L1 bit, and column 52 represents the L2 bit. For a read access to cache entry 0 in the cache block 34, the new value of the L0 bit and the L1 bit, in columns 56 and 54, respectively, is 11(b) and is written back to LRU register 32 for the respective cache block 34. The L2 bit is not updated, it is a don't care value. The L2 bit is a don't care value, depicted by an "x" in truth table 58, because there are three bits in the LRU register 32 and only four cache entries 33. Therefore, only two LRU bits need to be updated, and L0 and L1 bit are updated to 11(b), but L1 is a don't care for cache entries 2 and 3. However, utilizing a three bit LRU allows the ability of processing multiple four bit hit vectors, which is discussed further below with reference to FIG. 8.

Alternative embodiments utilize a two-bit LRU register 32 with four cache entries per cache block, or a three bit LRU with eight cache entries. One skilled in the art appreciates increasing the amount of LRU bits to correlate with the amount of cache entries.

Figure 6:
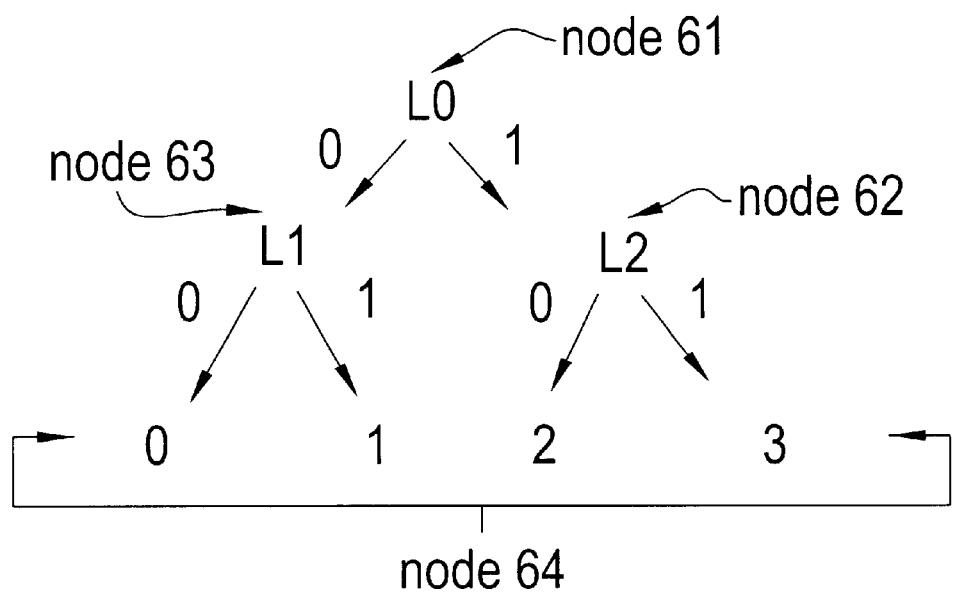
FIG. 6 illustrates a selection tree in accordance with the present invention.

FIG. 6 illustrates the logic of pseudo random logic block 40. The selection tree 60 depicts an analysis of the LRU bits, L0, L1, and L2 of the LRU register 32 for selecting the cache entry 33 to replace for a write operation.

Figure 7:
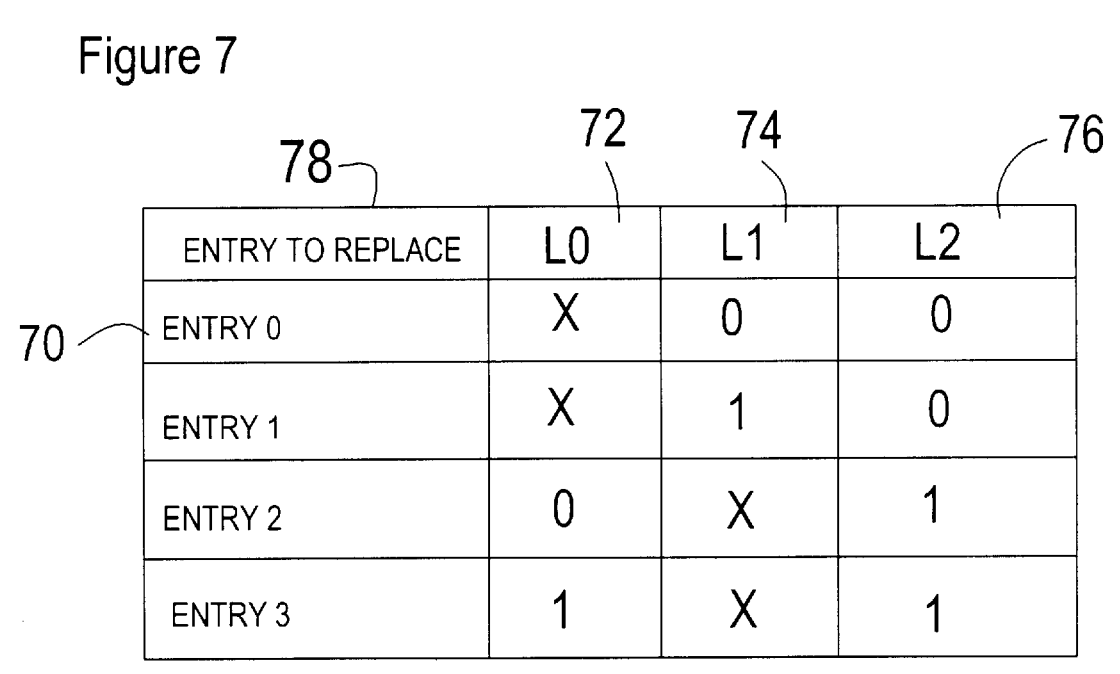

For example, for a write operation, an analysis of the previous read operation is needed to understand the settings of the LRU register 32. If the previous read operation occurs on cache entry 2 in cache block 0, the LRU bits in register 32, L0, L1 and L2, are set to 1x0(b), based on the values in the truth table 58 shown in FIG. 5. The x represents a don't care state and retains the value set from a previous setting, which for the sake of this example is a 1. Thus, in this example, the LRU bits are set to 110(b). The L0 bit is set to a 0, the L1 bit is a 1, and the L2 bit is set to a 1. Starting at node 61, the L0 bit has a value of 0 and the selection tree leads to node. Since the L1 bit is set to a value of 1, the selection tree ends at a value of 1 in node 64. The values of node 64 represent which cache entry 33 should be replaced for a write operation. Also, pointer 35 in FIG. 3 selects the cache entry 33 to be replaced for a write operation. Therefore, for this example, when the most recent read operation is performed on cache entry 2 and the LRU bits were set to a 110(b), the pointer 35 is selecting cache entry 1 for replacement. FIG. 7 is generated from the selection tree 60 by performing the same analysis for the remaining three cache entries.

FIG. 8 is a truth table 80 in accordance with an embodiment of the present invention depicting the logic of pseudo random logic block 42 in FIG. 4. The truth table 80 receives eight bits and outputs six bits. The inputs are two sets of four bit hit vectors, in columns 81 and 82, for the same cache block 34. Each location contains an input value for columns 81 and 82, and an output value for columns 83 and 84. The MEU 14 has dual ports and receives multiple memory requests and allows for the processing of two hit vectors for the same cache block. The truth table 80 outputs six bits consisting of three bits from column 83 and three bits from column 84. The NEW LRU and Write Mask columns, 83 and 84, are calculated by utilizing pseudo random logic. In order to handle multiple memory requests, or hit vectors, the invention processes both hit vectors. The truth table 80 analyzes both hit vectors, columns 81 and 82, and searches for a commonality between the values. An example of a common hit vectors is discussed in the next paragraph.

Since there are two columns for hit vectors 81 and 82, every location will have a corresponding location that is equivalent for both hit vectors, but interchanged between vector 1 and vector 2. For example, location 3 has a value for vector 1 of 0001(b), and for vector 2 of 1000(b). An equivalent location with similar values is location 19 where vector 2 is 0001(b) and vector 1 is 1000(b). Therefore, the actual values are similar, except the vector numbers are interchanged because the vector 1 value of location 3 is similar to the vector 2 value of location 19, and the vector 2 value of location 3 is similar to the vector 1 value of location 19. The pseudo random logic 42 processes the values of the eight bits regardless of which vector is processed first. Therefore, the two four-bit vectors to be analyzed are 0001(b) and 1000(b).

The first logic operation is a logical OR between the two vectors, 0001(b) and 1000(b). Therefore, the resulting four bit vector from a logical OR operation is 1001(b). The second operation consists of analyzing the value of 1001(b). Based on the format in column 81 and 82, the value of 1001(b) indicates the h3 bit and the h0 bit are set to 1. Also, the h2 and h1 bits are set to 0. A direct correlation exists between the h0, h1, h2 and h3 bits and a cache entry. For example, the h bits correspond to a cache entry. The h3 bit corresponds to cache entry 3, h2 bit corresponds to cache entry 2, the h1 bit corresponds to cache entry 1, and the h0 bit corresponds to cache entry 0. Therefore, in this case, the bits for cache entry 3 and cache entry 0 are set to 1, and the bits for cache entry 2 and cache entry 1 are set to 0. The value in the LRU column 83 is calculated based on the LRU bits from truth table 58 in FIG. 5 for cache entry 3 and cache entry 0. For example, the LRU status for a read operation for cache entry 0 is x11(b), for cache entry 3 is 0x0(b). By performing a logical OR operation on both values and ignoring the don't care bits (x), the resulting value is 011(b). This value of 011(b) is the NEW LRU value for both locations 3 and 19 in the LRU column 83.

The WRITE MASK bits, M0, M1, and M2 are calculated by determining which bits in the new LRU column 83 were altered by the calculation of the new LRU value. Based on the present example, the initial LRU bits were x11(b) and 0x0(b), and the new LRU 83 bits are 011(b). Ignoring the don't care bits, x, the only two bits which were altered are L0 and L1, since the L2 bit remains 0. Therefore, since bits L0 and L1 have been altered, they are set to a 1 in the Write Mask, and the L2 bit is a 0, resulting in M0=1, M1=1, M2=0 and a WRITE MASK of 011. Performing the previous method for all similar locations generates the values for columns 83 and 84.

Figure 9:
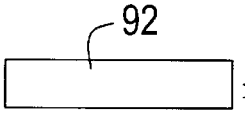
FIG. 9 illustrates a second circuit in accordance with the present invention.
Figure 9:
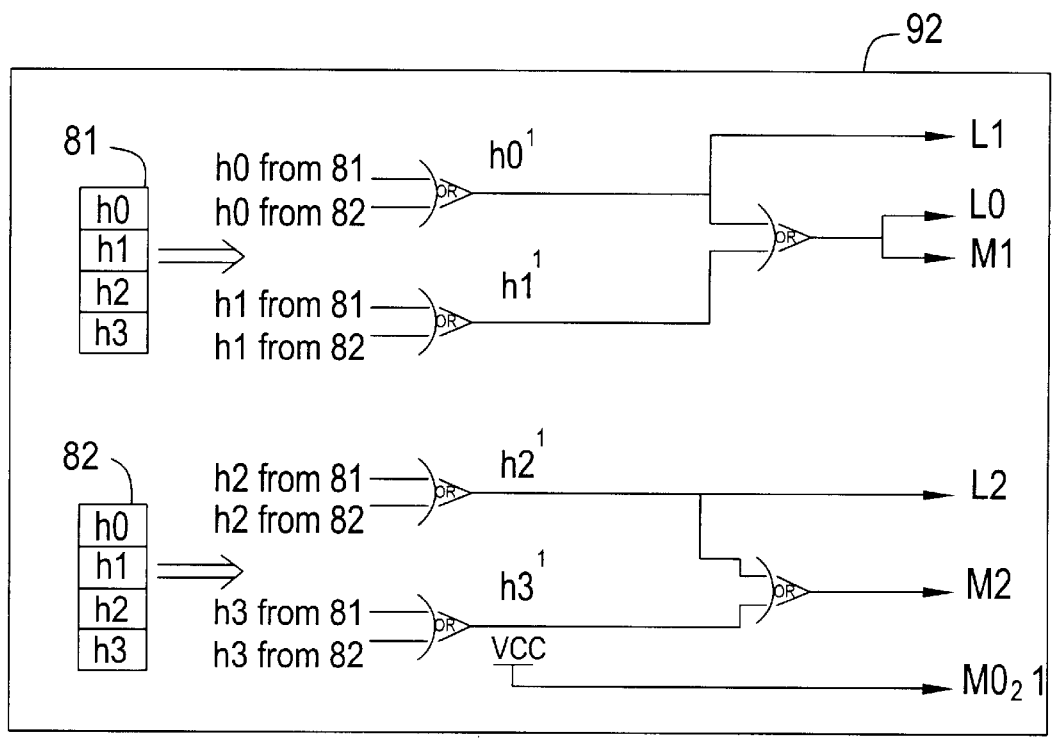

FIG. 9 illustrates a circuit 92 implementing the truth table 80 from FIG. 8 in accordance with an embodiment of the present invention. Circuit 92 receives 8 bits from columns 81 and 82. The corresponding bits in columns 81 and 82 are inputs to logic OR gates. Therefore, the h0 bit from column 81 and the h0 bit from column 82 are logically ORed and generates h0'. Also, the h1 bit from column 81 and the h1 bit from column 82 are logically ORed and generates h1'. The h2' and h3' bits are created in the same manner. The values in columns 83 and 84, LRU and Write Mask, are generated based on the values of h0', h1', h2', and h3'. For example, the L2 bit in column 83 is equal to the value of h2'. The L1 bit is equal to the value of h0'. The L0 bit is equal to the value of a logical OR of h0' with h1'. Similarly, the M1 bit is equal to the value of the logical OR of h0' with h1'. The M2 bit is equal to the value of a logical OR of h2' with h3'. The value of the M0 bit is a logical 1.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is contemplated, therefore, that such modifications can be made without departing from the spirit or scope of the present invention as defined in the appended claims.

What is claimed is:

1. A method for processing multiple memory read requests:

receiving a first memory read request comprising a first linear address;

receiving a second memory read request comprising a second linear address;

reading from a first and second cache entry in a cache block in a memory, the first and second linear addresses pointing to the first and second cache entries;

reading a least recently used status and a valid status for a first and second cache; and updating the least recently used status for the cache block based at least in part to a pseudo-random logic, wherein the pseudo-random logic is to support a first and second hit vector with a three bit least recently used status register, wherein only two bits are analyzed and one bit is a don't care, and the pseudo-random logic is to determine an output mask.

2. The method of claim 1 wherein updating the least recently used status for the cache block further comprises:

reading the least recently used status for the cache block;

identifying the least recently used cache entry; and updating the least recently used status of the cache block to a most recently used status for the cache block.

3. The method of claim 1 wherein the updating the least recently used status for the cache block comprises updating the least recently status for each cache entry in the cache block.

4. The method of claim 3 wherein updating the least recently used status for each cache block comprises setting a three bit least recently used register.

5. A system comprising:

a processor;

a cache coupled to the processor, the cache having stored therein a first array of entries;

a logic unit coupled to the processor and the cache to receive a memory request from the processor, select an entry from a second array and alter a status of the entry in the second array in response thereto, the logic unit comprising:

a plurality of registers to store a plurality of status bits and valid bits corresponding to the entries in the second array;

a circuit to receive the memory request and to modify the plurality of status bits based at least in part to a pseudo random logic, the logic unit to read the plurality of status bit and valid bits for every read cycle of one of the entries, and wherein the pseudo-random logic is to support a first and second hit vector with a three bit least recently used status register, wherein only two bits are analyzed and one bit is a don't care, and the pseudo-random logic is to determine an output mask.

6. The system of claim 5 wherein the logic unit further comprises:

a conversion module that translates the entry from the second array in response to the request; and a third array storing the translation of the entry from the second array.

7. The system of claim 5 wherein the cache is a fully associative level one instruction and data cache.

8. The system of claim 5 further comprising a counter either one of increments and decrements by a predetermined amount.

9. The system of claim 5 wherein the logic unit maintains the status of the set of entries in a three bit register.

10. The system of claim 5 wherein the third array comprises a plurality of physical addresses.

11. The system of claim 5 further comprising:

generating a control signal in response to the least recently used status and valid status in reference to the first and second cache entry.

12. The system of claim 11 wherein the circuit select either one of the plurality of valid bits and the plurality of status bits in response to the control signal.

* * * * *